United States Patent

Osplack et al.

[15] 3,673,660

[45] July 4, 1972

[54] METHOD OF PRODUCING INTERNAL GEARING

[72] Inventors: Joseph J. Osplack, 14001 Piedmont, Detroit, Mich. 48223; Rodman J. Osplack, 27425 Skye Drive West, Farmington, Mich. 48024

[22] Filed: Nov. 13, 1969

[21] Appl. No.: 876,368

[52] U.S. Cl. .................................... 29/159.2, 90/9, 90/10
[51] Int. Cl. ................ B21d 53/28, B21h 5/00, B21k 1/30, B23p 15/14, B29d 15/00
[58] Field of Search ................. 29/159, 159.2; 90/9, 10; 74/413, 438, 458, 460

[56] References Cited

UNITED STATES PATENTS

| | | | |
|---|---|---|---|
| 1,300,092 | 4/1919 | Acton | 90/10 |
| 1,963,756 | 6/1934 | Merz | 90/9 |
| 2,673,493 | 3/1954 | Hutchinson | 90/10 |

Primary Examiner—John F. Campbell
Assistant Examiner—Victor A. Di Palma
Attorney—Everett G. Wright

[57] ABSTRACT

The method of producing internal spur gears, internal helical gears, tapered internal spur gears, and tapered internal helical gears consists of employing a machining or stock removing tool having an effective transverse rack cross section composed of a basic or modified rack section of a width restricted to that required to produce the finished tooth profile without destroying the tooth profile of gear teeth adjacent to or spaced from gear teeth being cut, which machining or stock removing tool generates the tooth profile of the internal gear being cut with which the generating tool is operatively engaged while machining such an internal gear by timed translational displacement, the effective transverse rack cross section being the apparent rack envelope of the generating tool in the transverse plane cross section of said gear.

10 Claims, 22 Drawing Figures

INVENTORS
JOSEPH J. OSPLACK &
RODMAN J. OSPLACK

BY *Everett G. Wright*
ATTORNEY

INVENTORS
JOSEPH J. OSPLACK &
RODMAN J. OSPLACK
BY
ATTORNEY

INVENTORS
JOSEPH J. OSPLACK &
RODMAN J. OSPLACK
BY
ATTORNEY

INVENTORS
JOSEPH J. OSPLACK &
RODMAN J. OSPLACK
BY
ATTORNEY 3,673,660

METHOD OF PRODUCING INTERNAL GEARING

DESCRIPTION OF THE PRIOR ART

In the prior art, internal gears are normally generated by shaping or skiving. In such processes, the tooth profile of a gear is generated by timed circular or elliptical arc displacement of the cutting tool generating section in the transverse plane of the gear, thus producing properly formed and spaced internal gear teeth. Both the shaping and skiving processes require costly circular type cutting tools and extensive tool preparation time inasmuch as in most instances each shaping or skiving tool must be designed and formed primarily for its particular contemplated use. Furthermore, both the internal gear shaping and skiving processes subject the cutting tool to a relatively low service life, and are not suitable for cutting hardened internal gears, nor are they suitable for producing extremely high precision gears.

SUMMARY OF THE INVENTION

The primary object of the invention is to provide an improved and accurate method of manufacturing internal gearing, such as internal spur gears, internal helical gears, tapered internal spur gears, tapered internal helical gears and other gear-like forms employing a high-speed continuous rack type generating gear cutting process utilizing low-cost multiple application generating tools, the said method being particularly advantageously employed in the manufacture of gears of extremely high precision and of relatively large diameters, as, for example, 4 or 5 inches in diameter and larger.

With the instant invention, using an abrasive tool as the cutting tool, internal gears may readily be machined from either unhardened or hardened blanks without requiring initial machining of the gear teeth to an approximate finished contour.

DESCRIPTION OF THE DRAWINGS

Reference is now made to the drawings wherein like reference characters refer to like and corresponding parts throughout the several views, in which.

DESCRIPTION OF THE INVENTION

Typical of internal gears that may be produced according to the improved methods of the invention include but are not limited to the types of internal gearing shown in FIGS. 1, 2, 3 and 4.

Figure 1:
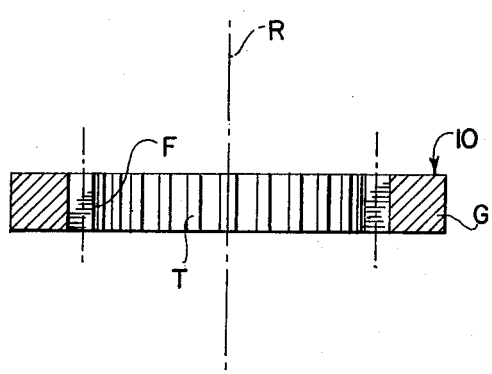
FIGS. 1, 2, 3 and 4 are cross sectional views through an internal spur gear, an internal helical gear, a tapered internal spur gear, and a tapered internal helical gear respectively, said views indicating several types of internal gears producable according to the instant invention.

In FIG. 1 is shown a cross sectional view of an internal spur gear 10 produced according to the invention formed from a gear blank G cylindrically apertured about its axis of rotation R providing an internal cylindrical face F. A plurality of evenly spaced teeth T are cut into the internal spur gear 10 parallel to its axis of rotation R.

Figure 2:
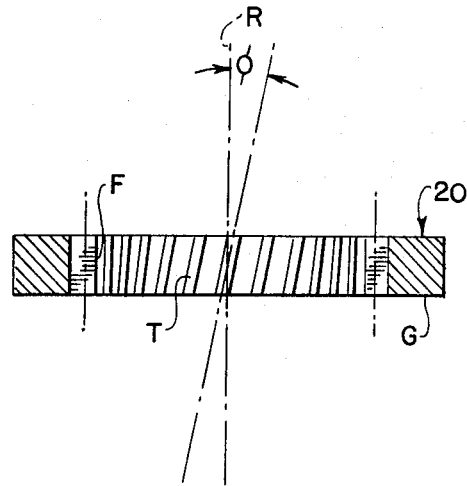

In FIG. 2 is shown a cross sectional view of an internal helical gear 20 produced according to the invention formed from a gear blank G cylindrically apertured about its axis of rotation R providing an internal cylindrical face F. A plurality of evenly spaced helically disposed teeth T are cut into the internal helical gear 20 at a helix angle $\phi$ greater than 0° to its axis of rotation R.

Figure 3:
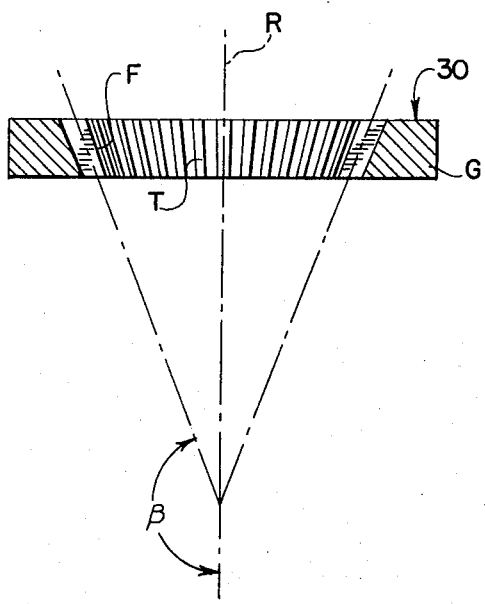

In FIG. 3 is shown a cross sectional view of a tapered internal spur gear 30 produced according to the invention formed from a gear blank G conically apertured about its axis of rotation R providing an internal conical face F. A plurality of evenly spaced diagonally axially disposed teeth T are cut into the tapered internal spur gear 30 at a cone angle $\beta$ of less than 180° to its axis of rotation R.

Figure 4:
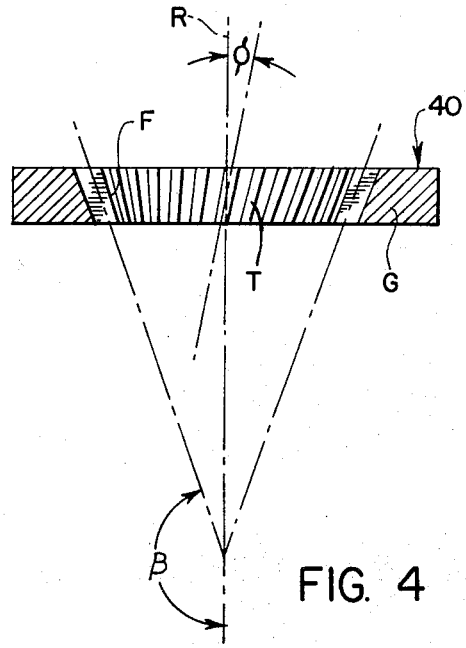

In FIG. 4 is shown a cross sectional view of a tapered internal helical gear 40 produced according to the invention formed from a gear blank G conically apertured about its axis of rotation R providing an internal conical face F. A plurality of evenly spaced spirally disposed teeth T are cut into the tapered internal helical gear 40 on a cone angle $\beta$ of less than 180° to its axis of rotation R and at a helix angle $\phi$ greater than 0°.

The generating tool employed in the invention may be any machining tool of a type that is designed to remove stock by abrasion, shaving, cutting, electrical discharge, or any other adequate method of stock removal. The said generating tool further having a rack cross section composed of a basic or modified rack section which generates the tooth profile in the gear blank with which the generating tool is operatively engaged while machining, the rack cross section being the apparent rack envelope of the generating tool in the transverse plane of said gear.

The generating tool of the invention develops the tooth profile of the gear blank with which it is operatively engaged while machining by conjugate action of its rack cross section with the transverse plane of the said gear, the relative displacement of the generating tool being translational.

The conjugate action of the rack cross section of the generating tool with the cross section of the gear is accomplished by synchronizing the tangential velocity of the generating tool and the rotational velocity of the gear at the pitch circle of the gear teeth thereof by means of mechanical, electrical, hydraulic, or other synchronous drives well known in the art.

Groups of FIGURES, FIGS. 5, 6 and 7, FIGS. 8, 9 and 10, FIGS. 11, 12 and 13, and FIGS. 14, 15 and 16, each illustrate more or less diagrammatically the timed generation of internal gears of the invention. In each of these Groups of FIGURES is a gear blank G which has a circular aperture therein disposed centrally about the axis of rotation R of the finished internal gear to be formed establishing the internal gear face F. Gear teeth T are formed in said gear blank G by timed generation such as employed in gear hobbing machines, gear hobbing grinders, and the like. The gear teeth T of the gear blank G are formed by a generating tool W which rotates about its axis of rotation C and has an effective rack cross section E which conforms to the theoretical rack N conjugate to the gear to be formed, the effective rack cross section being the apparent rack envelope of the generating tool in the normal plane cross section of the said gear. The direction of feed of the generating tool is shown to be parallel to its feed axis A as indicated by the arrow thereon; however, the feed of the generating tool may be radial, axial, tangential, or along any other suitable selected axis. One pass of the generating tool W for each tooth in the gear being cut across the face width of the gear blank G completely forms all the teeth of the finished gear.

Figure 7:
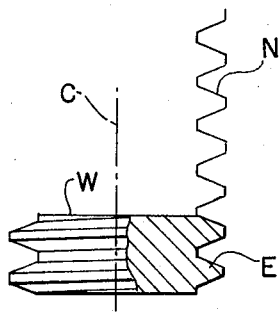
FIGS. 5, 6 and 7 are more or less diagrammatic views showing the relationship of a typical cutting tool and gear blank during the timed generation of internal spur gears such as indicated in FIG. 1.
Figure 6:
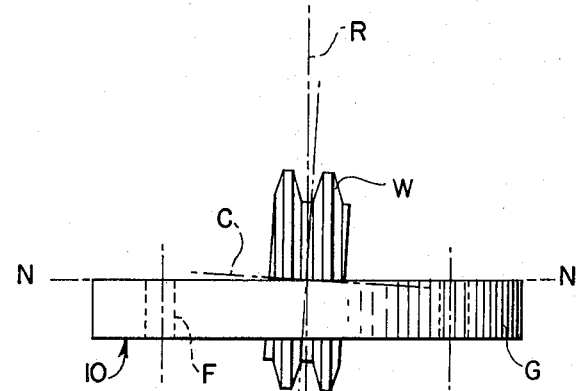
Figure 5:
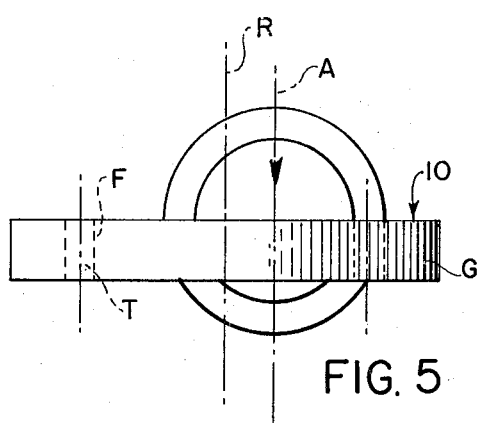

In particular, FIGS. 5, 6 and 7 illustrate the timed generation of an internal spur gear 10 according to the invention. The feed axis A of the generating tool W in generating the said internal spur gear is disposed parallel to the axis of rotation R of the gear blank G.

Figure 10:
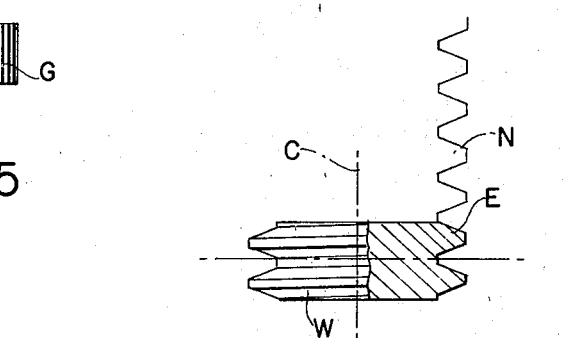
FIGS. 8, 9 and 10 are more or less diagrammatic views showing the relationship of a typical cutting tool and gear blank during the timed generation of internal helical gears such as indicated in FIG. 2.
Figure 8:
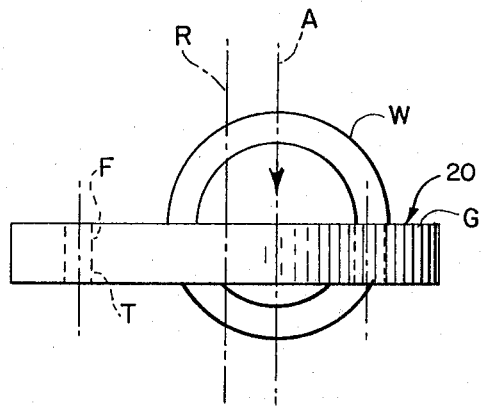
Figure 9:
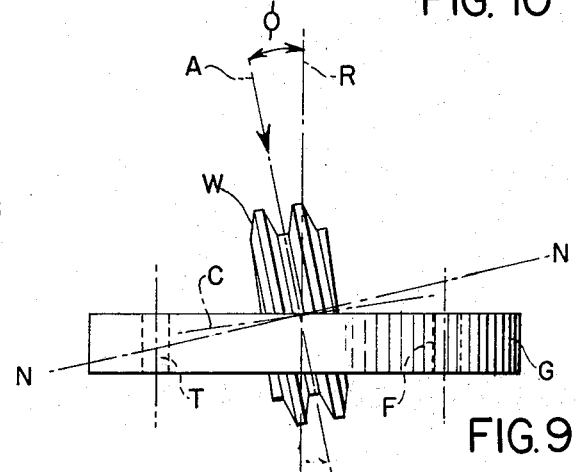

FIGS. 8, 9 and 10 illustrate the timed generation of an internal helical gear 20 according to the invention. The feed axis A of the generating tool W in generating the said internal helical gear is gisposed at the helix angle $\phi$ with respect to the axis of rotation R of the gear blank G.

Figure 11:
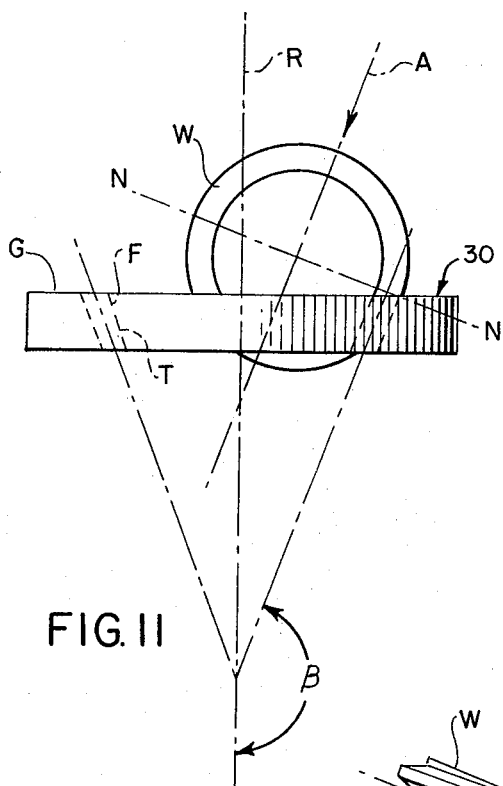
FIG. 11, 12 and 13 are more or less diagrammatic views showing the relationship of a typical cutting tool and gear blank during the timed generation of tapered internal spur gears such as indicated in FIG. 3.
Figure 12:
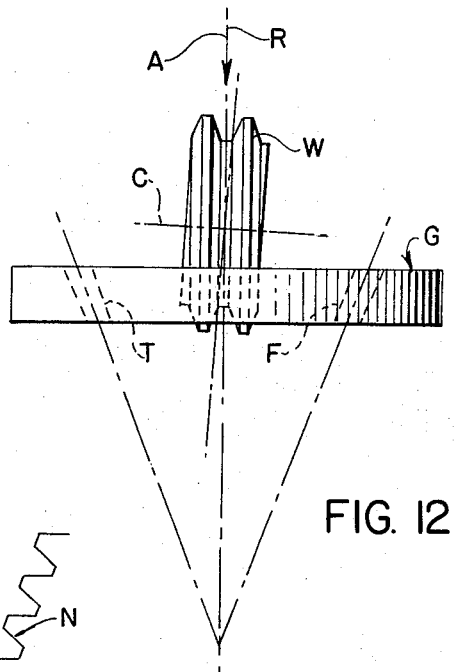
Figure 13:
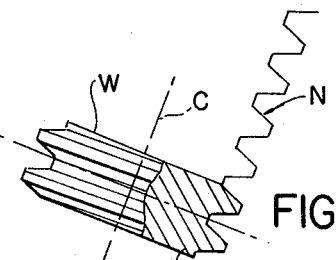

FIGS. 11, 12 and 13 illustrate the timed generation of a tapered internal spur gear 30 according to the invention. The feed axis A of the generating tool W in generating the said tapered internal spur gear is disposed at the cone angle $\beta$ with respect to the axis of rotation R of the gear blank G.

Figure 14:
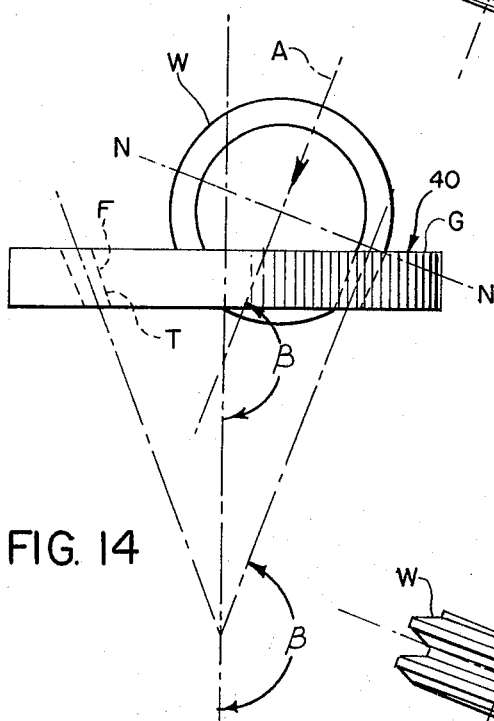
FIGS. 14, 15 and 16 are more or less diagrammatic views showing the relationship of the cutting tool and gear blank during the timed generation of tapered internal helical gears such as indicated in FIG. 4.
Figure 15:
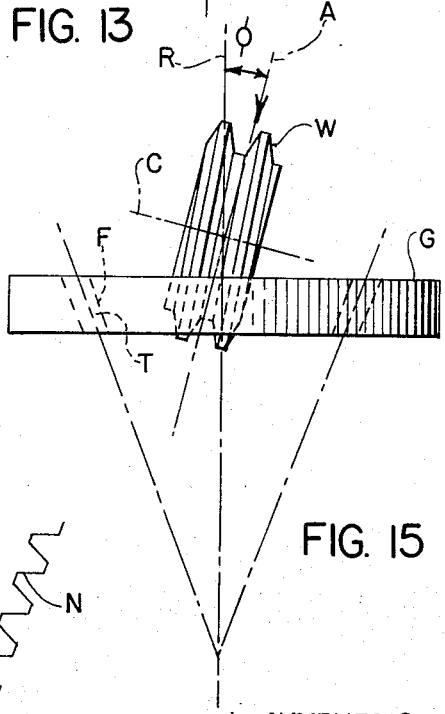
Figure 16:
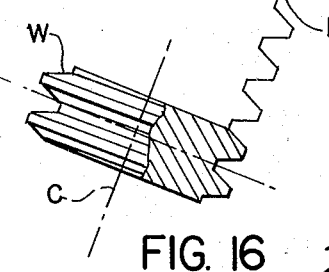

FIGS. 14, 15 and 16 illustrate the timed generation of a tapered internal helical gear 40 according to the invention. The feed axis A of the generating tool W in generating the said tapered internal helical gear is disposed at the cone angle $\beta$ and the helix angle $\phi$ with respect to the axis of rotation R of the gear blank G.

Figure 17:
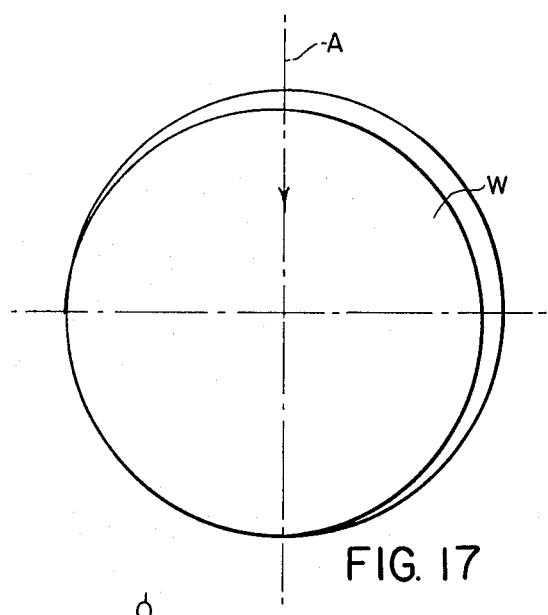
FIGS. 17, 18 and 19 are more or less diagrammatic views showing a typical rack type generating tool in the form of a threaded grinding wheel having a generating section of a basic rack form usable in carrying out the invention, applicable especially for forming internal gears of large diameter and/or having a large number of teeth.
Figure 18:
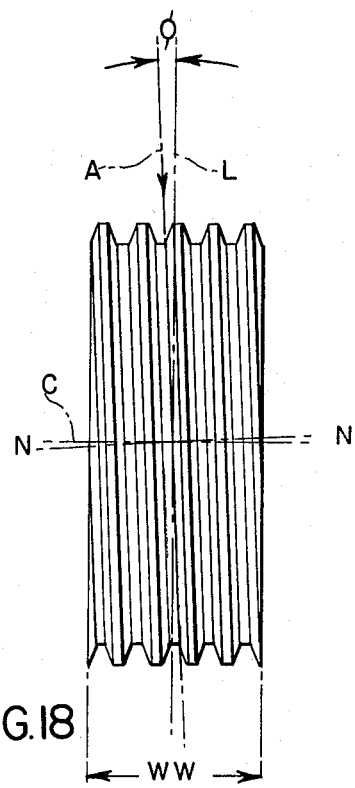
Figure 19:
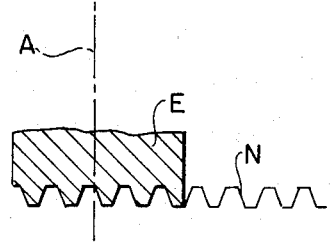

FIGS. 17, 18 and 19 show diagrammatically a gear generating tool of the invention indicated as, but not necessarily restricted to, a threaded grinding wheel W. The said threaded grinding wheel W is shown herein as having a rack cross section E equivalent to the effective basic rack cross section N. The feed axis A of the said threaded grinding wheel W is normal to the effective rack cross section E, and is disposed with respect to the transverse plane cross section L normal to the axis of rotation C thereof, at the helix angle $\phi$. The width WW of the generating tool W is restricted by the diameter and number of teeth in the gear to be cut and must be such that it does not destroy the tooth profile of gear teeth adjacent to or spaced from gear teeth being cut by said tool W.

Figure 21:
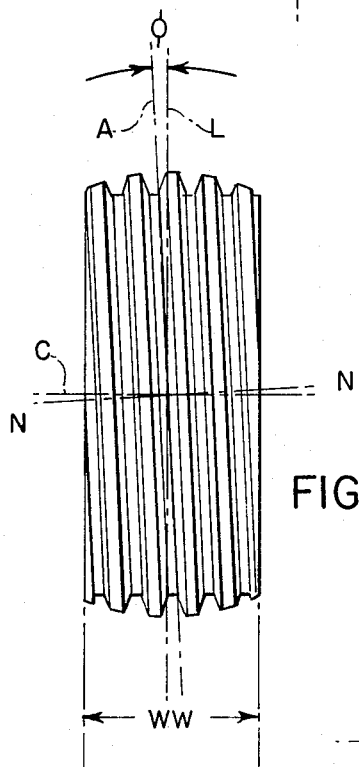
FIGS. 20, 21 and 22 are more or less diagrammatic views showing a typical rack type generating tool in the form of a threaded grinding wheel having a generating section of a modified rack form usable in carrying out the invention, applicable especially for forming internal gears of small diameters and/or having a small number of teeth.
Figure 20:
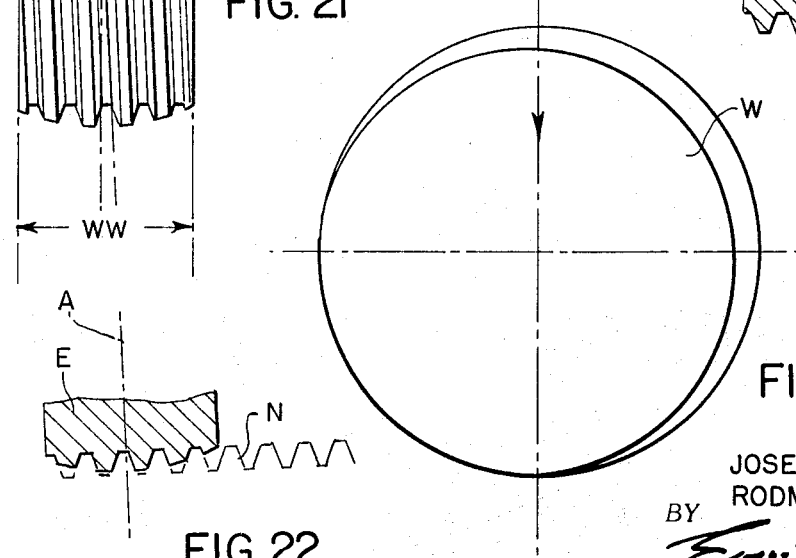
Figure 22:
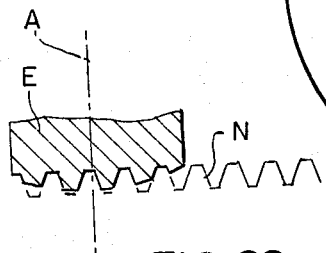

With reference to FIGS. 20, 21 and 22, the profile of the modified rack cross section E is determined by the cross section of the gear to be formed. And, the width WW of the generating tool W is determined by a gear of the minimum number of teeth for which the generating tool is applicable.

In general, any gear generating tool of the invention which has a basic rack cross section, such as shown at E in FIG. 19, and which is applicable to forming an internal gear of a certain minimum number of teeth of a given profile is also applicable to forming internal gears of greater number of teeth of the same profile.

Under certain circumstances, it may be advantageous or necessary to modify the profile of the basic rack cross section of the generating tool in order to generate a certain particular profile on the teeth of the gear to be formed. This results in a gear generating tool having a modified rack cross section E, such as shown in FIG. 22. However, a generating tool having a modified rack cross section may not be applicable to forming internal gears beyond a limited range of number of teeth.

The modification to the rack cross section E of the gear generating tool W, as shown in FIG. 22, is typical of several possible modifications that may be employed.

In addition, the diameter of the generating tool W may be of any diameter, which diameter is limited only in so far as permitted by the size of the central aperture of the internal gear to be formed.

We claim:

1. The method of forming internal gears comprising the steps of
   a. forming a gear blank with a circular aperture therein disposed at a selected conical angle of 0° to less than 90° about the axis of rotation of the finished internal gear to be formed therefrom whereby to establish an internal continuous gear face therein,
   b. forming a gear tooth generating tool having a rack cross section of a width restricted to that required to produce the finished tooth profile without destroying the tooth profile of gear teeth adjacent to or spaced from gear teeth being cut,
   c. machining said internally apertured gear blank with said gear tooth generating tool by conjugate action, and
   d. the feed axis of said gear teeth generating tool being disposed with respect to the axis of rotation of said gear blank at such an angular relationship as will permit said gear teeth to be cut to any conical and helical angle of 0° to less than 90°.

2. The method of forming internal gears as set forth in claim 1 wherein the gear tooth generating tool is formed with a modified rack cross section.

3. The method of forming internal spur gears comprising the steps of
   a. forming a gear blank with a cylindrical aperture therein about the axis of rotation of the finished spur gear to be formed therefrom whereby to establish an internal cylindrical gear face therein,
   b. forming a gear tooth generating tool having a rack cross section of a width restricted to that required to produce the finished tooth profile without destroying the tooth profile of gear teeth adjacent to or spaced from gear teeth being cut,
   c. machining said internally apertured spur gear blank with said gear tooth generating tool by conjugate action operatively engaging its rack cross section with the cross section of the gear being formed.

4. The method of forming internal spur gears as set forth in claim 1 wherein the gear tooth generating tool is formed with a modified rack cross section.

5. The method of forming internal helical gears comprising the steps of
   a. forming a gear blank with a cylindrical aperture therein about the axis of rotation of the finished helical spur gear to be formed therefrom whereby to establish an internal cylindrical gear face therein,
   b. forming a gear tooth generating tool having a rack cross section of a width restricted to that required to produce the finished tooth profile without destroying the tooth profile of gear teeth adjacent to or spaced from gear teeth being cut,
   c. machining said internally apertured spur gear blank with said gear tooth generating tool by conjugate action operatively engaging its effective transverse rack cross section with the transverse plane cross section of the gear being formed.

6. The method of forming internal helical gears as set forth in claim 5 wherein the gear tooth generating tool is formed with a modified rack cross section.

7. The method of forming tapered internal spur gears comprising the steps of
   a. forming a gear blank with a tapered cylindrical aperture therein about the axis of rotation of the finished tapered internal spur gear to be formed therefrom whereby to establish an internal tapered gear face therein,
   b. forming a gear tooth generating tool having a rack cross section of a width restricted to that required to produce the finished tooth profile without destroying the tooth profile of gear teeth adjacent to or spaced from gear teeth being cut,
   c. machining said internally apertured tapered spur gear blank with said gear tooth generating tool by conjugate action operatively engaging its effective transverse rack cross section with the transverse plane cross section of the gear being formed.

8. The method of forming tapered internal spur gears as set forth in claim 7 wherein the gear tooth generating tool is formed with a modified rack cross section.

9. The method of forming tapered internal helical gears comprising the steps of a. forming a gear blank with a tapered cylindrical aperture therein about the axis of rotation of the finished tapered internal helical gear to be formed therefrom whereby to establish an internal tapered gear face therein, b. forming a gear tooth generating tool having a rack cross section of a width restricted to that required to produce the finished tooth profile without destroying the tooth profile of gear teeth adjacent to or spaced from gear teeth being cut, c. machining said internally apertured tapered internal helical gear blank with said gear tooth generating tool by conjugate action operatively engaging its effective transverse rack cross section with the transverse plane cross section of the tapered internal helical gear being formed.

10. The method of forming tapered internal helical gears as set forth in claim 8 wherein the gear tooth generating tool is formed with a modified rack cross section.

* * * * *